United States Patent
Ogg et al.

(10) Patent No.: US 7,918,748 B2
(45) Date of Patent: Apr. 5, 2011

(54) GOLF BALL WITH VERY LOW COMPRESSION AND HIGH COR

(75) Inventors: Steven S. Ogg, Carlsbad, CA (US); David M. Bartels, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 73 days.

(21) Appl. No.: 12/469,470

(22) Filed: May 20, 2009

(65) Prior Publication Data

US 2010/0087277 A1 Apr. 8, 2010

Related U.S. Application Data

(60) Provisional application No. 61/102,918, filed on Oct. 6, 2008.

(51) Int. Cl.
*A63B 37/06* (2006.01)
(52) U.S. Cl. .................................................. 473/371
(58) Field of Classification Search .................. 473/373, 473/374, 367, 358, 371
See application file for complete search history.

(56) References Cited

U.S. PATENT DOCUMENTS

| | | |
|---|---|---|
| 878,854 A | 2/1908 | Taylor |
| 906,932 A | 12/1908 | Riblet |
| 922,773 A | 5/1909 | Kempshall |
| 985,741 A | 2/1911 | Harvey |
| 1,182,605 A | 5/1916 | Wadsworth |
| 1,265,036 A | 5/1918 | Bendelow |
| 1,286,834 A | 12/1918 | Taylor |
| 1,418,220 A | 5/1922 | White |
| 1,482,232 A | 1/1924 | Hazeltine |
| 1,656,408 A | 1/1928 | Young |
| 1,666,699 A | 4/1928 | Hagen |
| 1,681,167 A | 8/1928 | Beldam |
| 1,716,435 A | 6/1929 | Fotheringham |
| 1,855,448 A | 4/1932 | Hazeltine |
| 2,002,726 A | 5/1935 | Young |
| D107,066 S | 11/1937 | Cavignac |
| 2,106,704 A | 2/1938 | Davis |
| 2,643,125 A | 6/1953 | Juve |
| 2,728,576 A | 12/1955 | Martin et al. |
| 2,730,159 A | 1/1956 | Semegen |
| 2,741,480 A | 4/1956 | Smith |
| 2,861,810 A | 11/1958 | Veatch |
| 2,997,302 A | 8/1961 | Smith |
| 3,031,194 A | 4/1962 | Strayer |
| RE025,427 E | 7/1963 | Harkins |
| D228,394 S | 9/1973 | Martin et al. |
| 3,819,190 A | 6/1974 | Nepela et al. |
| 3,940,145 A | 2/1976 | Gentiluomo |
| D243,866 S | 3/1977 | Shaw et al. |
| D247,685 S | 4/1978 | Haines et al. |
| 4,090,716 A | 5/1978 | Martin et al. |
| 4,123,061 A | 10/1978 | Dusbiber |
| 4,141,559 A | 2/1979 | Melvin et al. |

(Continued)

*Primary Examiner* — Raeann Trimiew
(74) *Attorney, Agent, or Firm* — Michael A. Catania

(57) ABSTRACT

A golf ball having a very low compression and a high COR is disclosed herein. The core preferably comprises a single neodymium-catalyzed polybutadiene, and has a diameter ranging from 1.575 inch to 1.62 inch with a PGA compression ranging from 20 to 45. The cover preferably has a thickness ranging from 0.038 inch to 0.045 inch, and a Shore D hardness ranging from 50 to 58. The golf ball preferably has a coefficient of restitution of at least 0.780, and a PGA compression ranging from 35 to 50.

6 Claims, 2 Drawing Sheets

U.S. PATENT DOCUMENTS

| | | | |
|---|---|---|---|
| 4,142,727 A | 3/1979 | Shaw | |
| 4,201,384 A | 5/1980 | Barber | |
| 4,235,441 A | 11/1980 | Ciccarello | |
| 4,256,304 A | 3/1981 | Smith et al. | |
| 4,258,921 A | 3/1981 | Worst | |
| 4,266,773 A | 5/1981 | Treadwell | |
| 4,323,247 A | 4/1982 | Keches et al. | |
| 4,346,898 A | 8/1982 | Badke | |
| 4,483,537 A | 11/1984 | Hanada et al. | |
| 4,526,375 A | 7/1985 | Nakade | |
| 4,560,168 A | 12/1985 | Aoyama | |
| 4,567,219 A | 1/1986 | Tominaga et al. | |
| 4,653,758 A | 3/1987 | Solheim | |
| 4,660,834 A | 4/1987 | Carrigan | |
| 4,679,795 A | 7/1987 | Melvin et al. | |
| 4,681,323 A | 7/1987 | Alaki et al. | |
| 4,720,111 A | 1/1988 | Yamada | |
| 4,722,529 A | 2/1988 | Shaw et al. | |
| 4,729,567 A | 3/1988 | Oka et al. | |
| 4,729,861 A | 3/1988 | Lynch et al. | |
| 4,744,564 A | 5/1988 | Yamada | |
| 4,762,326 A | 8/1988 | Gobush | |
| 4,765,626 A | 8/1988 | Gobush | |
| 4,770,422 A | 9/1988 | Isaac | |
| 4,772,026 A | 9/1988 | Gobush | |
| 4,787,638 A | 11/1988 | Kobayashi | |
| 4,804,189 A | 2/1989 | Gobush | |
| 4,813,677 A | 3/1989 | Oka et al. | |
| 4,830,378 A | 5/1989 | Aoyama | |
| 4,838,556 A | 6/1989 | Sullivan | |
| 4,840,381 A | 6/1989 | Ihara et al. | |
| 4,844,471 A | 7/1989 | Terence et al. | |
| 4,844,472 A | 7/1989 | Ihara | |
| 4,848,766 A | 7/1989 | Oka et al. | |
| 4,852,884 A | 8/1989 | Sullivan | |
| 4,858,923 A | 8/1989 | Gobush et al. | |
| 4,867,459 A | 9/1989 | Ihara | |
| 4,869,512 A | 9/1989 | Nomura et al. | |
| 4,877,252 A | 10/1989 | Shaw | |
| 4,880,241 A | 11/1989 | Melvin et al. | |
| 4,886,277 A | 12/1989 | Mackey | |
| 4,911,451 A | 3/1990 | Sullivan et al. | |
| 4,915,389 A | 4/1990 | Ihara | |
| 4,921,255 A | 5/1990 | Taylor | |
| 4,925,193 A | 5/1990 | Melvin et al. | |
| 4,932,664 A | 6/1990 | Pocklington et al. | |
| 4,936,587 A | 6/1990 | Lynch et al. | |
| 4,949,976 A | 8/1990 | Gobush | |
| 4,960,282 A | 10/1990 | Shaw | |
| 4,960,283 A | 10/1990 | Gobush | |
| 4,968,038 A | 11/1990 | Yamada | |
| 4,971,330 A | 11/1990 | Morell | |
| 4,973,057 A | 11/1990 | Morell | |
| 4,974,853 A | 12/1990 | Morell | |
| 4,974,854 A | 12/1990 | Morell | |
| 4,974,855 A | 12/1990 | Morell | |
| 4,974,856 A | 12/1990 | Morell | |
| 4,979,747 A | 12/1990 | Jonkouski | |
| 4,982,964 A | 1/1991 | Morell | |
| 4,986,545 A | 1/1991 | Sullivan | |
| 4,991,852 A | 2/1991 | Pattison | |
| 4,998,733 A | 3/1991 | Lee | |
| 5,009,427 A | 4/1991 | Stiefel et al. | |
| 5,009,428 A | 4/1991 | Yamagishi et al. | |
| 5,016,887 A | 5/1991 | Jonkouski | |
| 5,018,741 A | 5/1991 | Stiefel et al. | |
| 5,024,444 A | 6/1991 | Yamagishi et al. | |
| 5,033,750 A | 7/1991 | Yamagishi et al. | |
| 5,044,638 A | 9/1991 | Nesbitt et al. | |
| 5,046,742 A | 9/1991 | Mackey | |
| 5,060,953 A | 10/1991 | Bunger et al. | |
| 5,060,954 A | 10/1991 | Gobush | |
| 5,062,644 A | 11/1991 | Lee | |
| 5,064,199 A | 11/1991 | Morell | |
| 5,072,945 A | 12/1991 | Oka et al. | |
| 5,078,402 A | 1/1992 | Oka | |
| 5,080,367 A | 1/1992 | Lynch et al. | |
| 5,087,048 A | 2/1992 | Sun et al. | |
| 5,087,049 A | 2/1992 | Yamagishi et al. | |
| 5,090,705 A | 2/1992 | Oka et al. | |
| 5,092,604 A | 3/1992 | Oka | |
| 5,106,096 A | 4/1992 | Dunn | |
| 5,123,652 A | 6/1992 | Oka | |
| 5,127,655 A | 7/1992 | Yamada et al. | |
| 5,143,377 A | 9/1992 | Oka et al. | |
| 5,145,180 A | 9/1992 | Oka | |
| 5,149,100 A | 9/1992 | Melvin et al. | |
| 5,156,404 A | 10/1992 | Oka et al. | |
| 5,158,300 A | 10/1992 | Aoyama | |
| 5,174,578 A | 12/1992 | Oka et al. | |
| 5,190,294 A | 3/1993 | Oka | |
| 5,192,078 A | 3/1993 | Woo | |
| 5,192,079 A | 3/1993 | Sun et al. | |
| 5,201,522 A | 4/1993 | Pocklington et al. | |
| 5,209,485 A | 5/1993 | Nesbitt et al. | |
| 5,249,804 A | 10/1993 | Sanchez | |
| 5,253,872 A | 10/1993 | Lemons et al. | |
| 5,259,624 A | 11/1993 | Puckett | |
| 5,273,287 A | 12/1993 | Molitor | |
| 5,292,132 A | 3/1994 | Oka | |
| 5,301,951 A | 4/1994 | Morell | |
| 5,308,076 A | 5/1994 | Sun | |
| 5,332,226 A | 7/1994 | Kim | |
| 5,338,039 A | 8/1994 | Oka et al. | |
| 5,356,150 A | 10/1994 | Lavallee | |
| 5,490,673 A | 2/1996 | Hiraoka | |
| 5,588,924 A | 12/1996 | Sullivan et al. | |
| 5,803,831 A | 9/1998 | Sullivan et al. | |
| 5,971,870 A | 10/1999 | Sullivan et al. | |
| 6,015,356 A | 1/2000 | Sullivan et al. | |
| 6,142,886 A | 11/2000 | Sullivan et al. | |
| 6,520,870 B2 * | 2/2003 | Tzivanis et al. | 473/371 |
| 2005/0250601 A1 * | 11/2005 | Kim et al. | 473/371 |

* cited by examiner

GOLF BALL WITH VERY LOW COMPRESSION AND HIGH COR

CROSS REFERENCES TO RELATED APPLICATIONS

The Present Application claims priority to U.S. Provisional Patent Application No. 61/102,918, filed on Oct. 6, 2008.

STATEMENT REGARDING FEDERALLY SPONSORED RESEARCH OR DEVELOPMENT

Not Applicable

BACKGROUND OF THE INVENTION

1. Field of the Invention

The present invention relates to a golf ball. More specifically, the present invention relates to a golf ball with a low PGA compression and a high coefficient of restitution.

2. Description of the Related Art

The prior art discloses various two-piece golf balls.

Sullivan et al., U.S. Pat. No. 4,911,451, for a Golf Ball Cover Of Neutralized Poly(ethylene-acrylic acid) Copolymer, discloses in Table One a golf ball having a compression of below 50 and a cover composed of ionomers having various Shore D hardness values ranging from 50 to 61.

Sullivan, U.S. Pat. No. 4,986,545, for a Golf Ball discloses a golf ball having a Rhiele compression below 50 and a cover having Shore C values as low as 82.

Egashira et al., U.S. Pat. No. 5,252,652, for a Solid Golf-Ball, discloses the use of a zinc pentachlorothiophenol in a core of a golf ball.

Pasqua, U.S. Pat. No. 5,721,304, for a Golf Ball Composition, discloses a golf ball with a core having a low compression and the core comprising calcium oxide.

Sullivan, et al., U.S. Pat. No. 5,588,924, for a Golf Ball discloses a golf ball having a PGA compression below 70 and a COR ranging from 0.780 to 0.825.

Sullivan et al., U.S. Pat. No. 6,142,886, for a Golf Ball And Method Of Manufacture discloses a golf ball having a PGA compression below 70, a cover Shore D hardness of 57, and a COR as high as 0.794.

Tzivanis et al., U.S. Pat. No. 652,870, for a Golf Ball, discloses a golf ball having a core compression less than 50, a cover Shore D hardness of 55 or less, and a COR greater than 0.80.

The prior art fails to disclose a golf ball with a very low PGA compression and a high coefficient of restitution.

BRIEF SUMMARY OF THE INVENTION

The present invention provides a golf ball with a very low PGA compression and a high coefficient of restitution. The present invention is able to achieve these results by providing a core with a PGA compression less than 45, a cover with a Shore D hardness less than 60 and a thickness ranging from 0.035 to 0.050 inch, and a ball coefficient of restitution greater than 0.780.

One aspect of the present invention is a golf ball including a core and a cover. The core includes a single neodymium-catalyzed polybutadiene, zinc diacrylate ranging from 10 to 20 weight percent of the core, zinc oxide ranging from 10 to 17 weight percent of the core, zinc stearate in an amount of 3 to 8 weight percent of the core and zinc pentachlorothiophenol in an amount of 0.25 to 1.0 weight percent of the core. The core has a mass ranging from 38 grams to 42 grams, a diameter ranging from 1.575 inch to 1.62 inch, and a PGA compression ranging from 20 to 45. The cover is disposed on the core and is composed of a material comprising a blend of ionomers. The cover has a thickness ranging from 0.038 inch to 0.045 inch. The cover material has a Shore D hardness ranging from 50 to 58. The golf ball has a diameter of at least 1.68 inches, a mass of at least 45 grams, a coefficient of restitution of at least 0.780, and a PGA compression ranging from 35 to 50.

Another aspect of the present invention is a golf ball having a solid core comprising a single neodymium-catalyzed polybutadiene. The core has a mass ranging from 38 grams to 42 grams, a diameter ranging from 1.575 inch to 1.62 inch, and a PGA compression ranging from 20 to 45. The golf ball also has a cover disposed on the core. The cover is composed of a material comprising a blend of ionomers. The cover has a thickness ranging from 0.038 inch to 0.045 inch. The cover material has a Shore D hardness ranging from 50 to 58. The golf ball has a diameter of at least 1.68 inches, a mass of at least 45 grams, a coefficient of restitution of at least 0.780, and a PGA compression ranging from 35 to 50.

Yet another aspect of the present invention is a golf ball a having a diameter of at least 1.68 inches, a mass of at least 45 grams, a coefficient of restitution of at least 0.780, and a PGA compression ranging from 35 to 50. The golf ball has a solid core having a mass ranging from 38 grams to 42 grams, a diameter ranging from 1.575 inch to 1.62 inch, and a PGA compression ranging from 20 to 35. The golf ball also has a cover disposed on the core. The cover is composed of a material comprising a blend of ionomers. The cover has a thickness ranging from 0.035 inch to 0.050 inch. The cover material has a Shore D hardness ranging from 50 to 58.

Yet another aspect of the present invention is a golf ball having a cover composed of a material comprising a blend of ionomers and having a Shore D hardness ranging from 50 to 58. The cover is disposed on a solid core having a mass ranging from 38 grams to 42 grams and a PGA compression ranging from 20 to 30. The golf ball has a diameter of at least 1.68 inches, a mass of at least 45 grams, a coefficient of restitution of at least 0.790, and a PGA compression ranging from 35 to 50.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
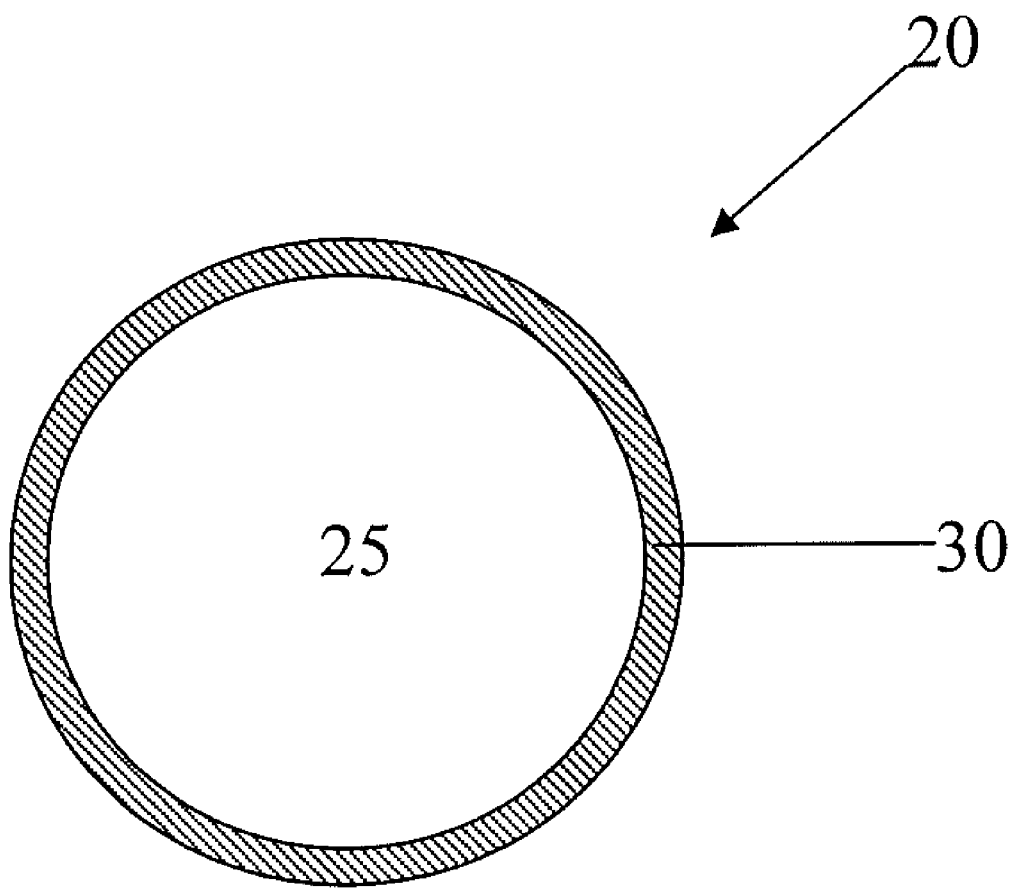
FIG. 1 is a cross-sectional view of a golf ball.

As shown in FIG. 1, a golf ball 20 includes a core 25 and a cover 30. The core 25 is a solid core and cover 30 is disposed on the core 25. Preferably, the core 25 is compression molded into a spherical shape and the cover 30 is injection molded over the core 25.

The golf ball 20 preferably has a diameter of at least 1.68 inches and a mass of approximately 45 grams. The golf ball 20 preferably has a coefficient of restitution ("COR") of at least 0.780, more preferably at least 0.790, and most preferably at least 0.8. The golf ball 20 preferably has an aerodynamic surface pattern such as disclosed in U.S. Patent Number, which is hereby incorporated by reference.

The core 25 is preferably composed of a polybutadiene-based mixture generally comprising a single neodymium-catalyzed polybutadiene, zinc oxide, zinc stearate, peroxide and zinc pentachlorothiophenol. The polybutadiene is preferably present in an amount ranging from 55 to 75 weight percent of the core, more preferably from 60 to 70 weight percent of the core, and most preferably approximately 65 weight percent of the core. The zinc oxide is preferably present in an amount ranging from 5 to 20 weight percent of the core, more preferably ranging from 10 to 17 weight percent of the core, and most preferably 14 weight percent of the core. The zinc stearate is preferably present in an amount ranging from 1 to 15 weight percent of the core, more preferably from 3 to 8 weight percent of the core and most preferably 5 weight percent of the core. The zinc pentachlorothiophenol is preferably present in an amount ranging from 0.25 to 1.0 weight percent of the core, more preferably from 0.5 to 0.75, and most preferably 0.68 weight percent of the core.

The core 25 preferably has a diameter ranging from 1.575 to 1.62 inches, more preferably ranging from 1.58 to 1.60 inches, and not preferably 1.595 inches. The core 25 preferably has a PGA compression below 50, more preferably below 45, and most preferably ranging from 20 to 35. The core 25 preferably has a mass ranging from 38 grams to 42 grams, most preferably approximately 40 grams.

The cover 30 is preferably composed of a material that has a Shore D hardness ranging from 50 to 58 and a thickness ranging from 0.035 to 0.050 inch. Cover Shore D hardness and thickness are the two primary contributions from the cover 30 in providing a golf ball 20 that can achieve a very low compression (softness) and a high COR.

The cover 30 is preferably composed of a blend of ionomers. One preferred embodiment comprises a SURLYN 8320, a SURLYN 8945, a SURLYN 9945, a SURLYN 8940 and a masterbatch. The SURLYN 8320 is preferably present in an amount ranging from 5 to 20 weight percent of the cover, more preferably 10 to 15 weight percent, and most preferably 13 weight percent. The SURLYN 8945 is preferably present in an amount ranging from 15 to 35 weight percent of the cover, more preferably 20 to 30 weight percent, and most preferably 26 weight percent. The SURLYN 9945 is preferably present in an amount ranging from 30 to 50 weight percent of the cover, more preferably 35 to 45 weight percent, and most preferably 41 weight percent. The SURLYN 8940 is preferably present in an amount ranging from 5 to 15 weight percent of the cover, more preferably 7 to 12 weight percent, and most preferably 10 weight percent.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The compositions of the cover 30 may include other ionomers from DuPont (E. I. DuPont de Nemours & Company), sold under the SURLYN brand, and ionomers sold by Exxon Corporation under the ESCOR or IOTEK brands, or blends thereof. Examples of other compositions which may be used as the material of the cover 30 are set forth in detail in U.S. Pat. No. 5,688,869, which is incorporated herein by reference.

The high acid ionomers which may be suitable for use in formulating the cover material compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10-100%, preferably 30-70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 993, and 994. In this regard, ESCOR or IOTEK 959 is a sodium ion neutralized ethylene-acrylic neutralized ethylene-acrylic acid copolymer. According to Exxon, IOTEKS 959 and 960 contain from about 19.0 to about 21.0% by weight acrylic acid with approximately 30 to about 70 percent of the acid groups neutralized with sodium and zinc ions, respectively.

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the cover 30 of the golf ball 20 may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The cover material compositions may include the low acid ionomers such as those developed and sold by E. I. DuPont de Nemours & Company under the SURLYN and by Exxon Corporation under the brands ESCOR and IOTEK, ionomers made in-situ, or blends thereof.

In determining PGA compression using the 0 to 200 scale, a standard force is applied to the external surface of the ball. A ball that exhibits no deflection (0.0 inches of deflection) is rated 200 and a ball that deflects 0.2 inches is rated 0. Every change of 0.001 inch in deflection represents a 1 point drop in compression value. Consequently, a ball that deflects 0.1 inches (100×0.001 inches) has a PGA compression value of 100 and a ball that deflects 0.110 inches (110×0.001 inches) has a PGA compression value of 90.

In order to assist in the determination of PGA compression, several devices have been employed in the art. For example, PGA compression is determined by a golf ball compression tester fashioned in the form of a press with an upper and lower anvil. The upper anvil is at rest against a 200 pound (lbs) die spring, and the lower anvil is movable through 0.300 inches by means of a crank mechanism. In the open position, the gap between the anvils is 1.780 inches, allowing a clearance of 0.200 inches for insertion of the ball. As the lower anvil is raised by the crank mechanism, it compresses the ball against the upper anvil, with such compression occurring during the last 0.200 inches of lower anvil stroke. The golf ball then loads the upper anvil, which in turn loads the die spring. The equilibrium point of the upper anvil is measured by a dial micrometer. When the upper anvil is deflected by the golf ball more than 0.100 in (a lesser extent of deflection is simply regarded as zero compression), the reading on the micrometer dial is referred to as the compression of the ball. In practice, tournament quality golf balls have PGA compression ratings around 80 to 100, which means that the upper anvil was deflected a total of 0.120 to 0.100 inches. When golfball components (i.e., centers, cores, mantled core, etc.) with diameters smaller than 1.680 inches are utilized, metallic shims are included such that the combined diameter of the shims and the component is 1.680 inches.

Determining golf ball compression can also be carried out via a compression tester sold by OK Automation, formerly, Atti Engineering Corporation. This golf ball compression tester is calibrated against a calibration spring provided by OK Automation. The compression value obtained by such a tester (referred to as Atti compression) relates to an arbitrary value expressed by a number that may range from 0 to 100 (a value of 200 can also be measured by two revolutions of a dial indicator, which is described below). Atti compression values that are obtained define the deflection that a golf ball undergoes when subjected to compressive loading. The golf ball compression tester consists of a lower movable platform and an upper movable spring-loaded anvil. A dial indicator of the compression tester is mounted such that it measures the upward movement of the spring-loaded anvil. A golf ball to be tested is placed in the lower platform, which is then raised a fixed distance. The upper portion of the golf ball comes in contact with and exerts a pressure on the spring-loaded anvil, forcing the anvil upward against a spring.

Alternative devices, apparatuses or testers have also been employed to determine golf ball compression. For example, a modified Riehle compression device (Riehle Bros. Testing Machine Company) can be used to evaluate the compression of various golf ball components (i.e., cores, mantle cover balls, finished balls, etc.). The modified Riehle compression device determines golf ball deformation in thousandths of an inch via a load designed to emulate the 200 lbs spring constant of other golf ball compression testers such as those described above. With a modified Riehle compression device, a Riehle compression value of 61 corresponds to a load deflection of 0.061 in. Furthermore, additional golf ball compression devices, apparatuses or testers may also be utilized to monitor and evaluate ball compression. Such devices, apparatuses or testers include a Whitney tester and Instron™ device, which can correlate or correspond to, for example, PGA or Atti compression values.

Additionally, an approximate relationship between Riehle compression and PGA compression exists for balls of the same size. It has been determined by Applicant that Riehle compression corresponds to PGA compression by the general formula. PGA compression=160-Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Compression was measured using an Instron™ device, namely, model 5544. Compression of golf ball components were measured based on the deflection (in inches) caused by a 200 lbs load applied during a load control mode with a rate of 15 kilopounds per second (kips s$^{-1}$), an approach speed of 20 in per minute and a preload of 0.2 pound-force (lbf) (in addition to device system compliance).

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (aerodynamic surface pattern, land area, etc.) of the ball.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2° from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

As used herein, "Shore D hardness" of a cover 30 is measured generally in accordance with ASTM D-2240, except the measurements are made on the curved surface of a molded cover 30, rather than on a plaque. Furthermore, the Shore D hardness of the cover 30 is measured while the cover 30 remains over the core 25.

Figure 2:
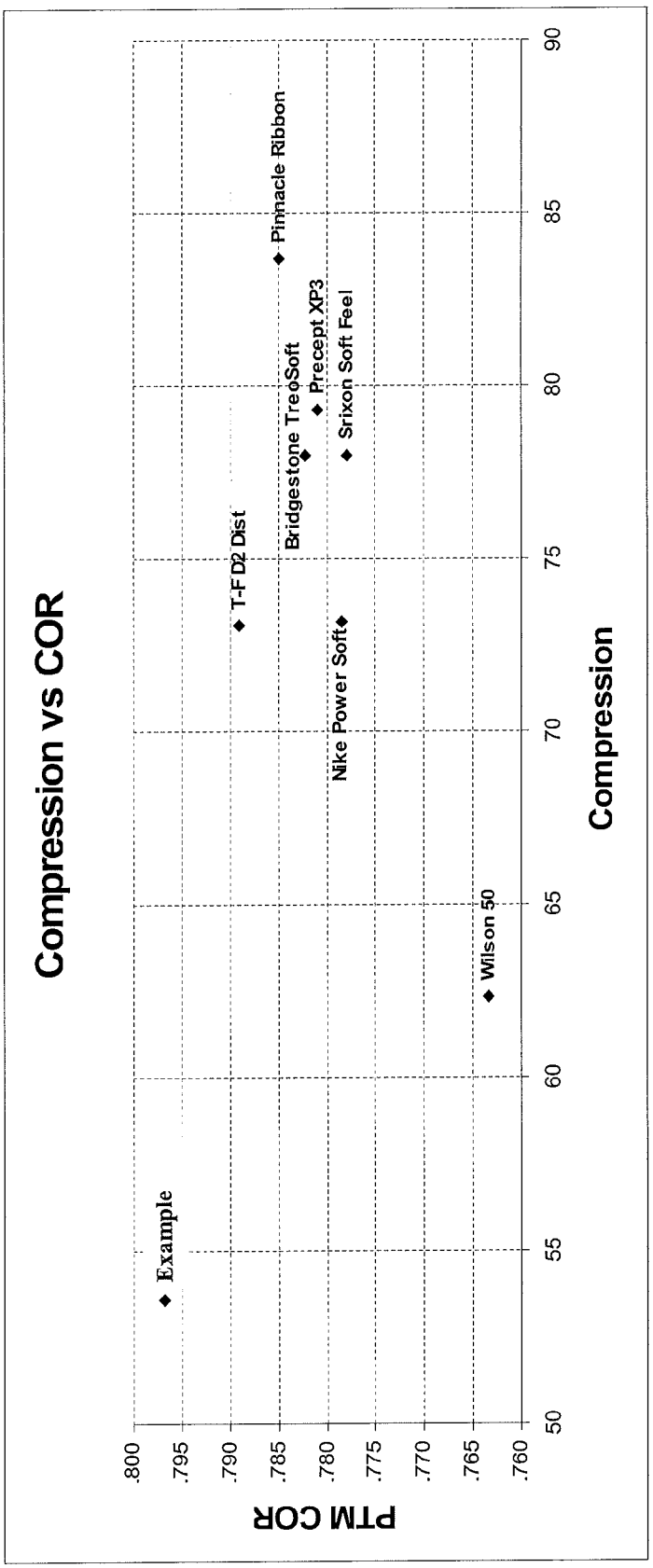
FIG. 2 is a graph of golf ball compression (utilizing an INSTRON machine at a 200 pound load) vs. Coefficient of Restitution at 125 feet per second.

As shown in FIG. 2, and in Table One below, the golf ball of the present invention has a much lower compression (utilizing an INSTRON machine with a 200 pound load) and a much higher COR than commercially available golf balls.

TABLE ONE

| Ball | Compression | COR (125 ft/sec) |
|---|---|---|
| Example 1 | 53 | 0.80 |
| NIKE Precision Power Distance Soft | 73 | 0.78 |
| WILSON STAFF 50 | 62 | 0.76 |
| PINNACLE RIBBON | 84 | 0.78 |
| BIRDGESTONE TREO SOFT | 78 | 0.78 |
| SRIXON soft feel | 78 | 0.78 |
| PRECEPT XP3 | 79 | 0.78 |
| TOP-FLITE D2 DISTANCE | 73 | 0.79 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as are invention the following:

1. A two-piece golf ball comprising:
   a core comprising a single neodymium-catalyzed polybutadiene, zinc diacrylate ranging from 10 to 20 weight percent of the core, zinc oxide ranging from 10 to 17 weight percent of the core, zinc stearate in an amount of 3 to 8 weight percent of the core and zinc pentachlorothiophenol in an amount of 0.25 to 1.0 weight percent of the core, wherein the core has a mass ranging from 38 grams to 42 grams, a diameter ranging from 1.575 inch to 1.62 inch, and a PGA compression ranging from 20 to 30;
   a cover disposed on the core, the cover composed of a material comprising a very-low modulus ethylene/methacrylic acid copolymer with partial neutralization of the acid groups with sodium ions in an amount of 5 to 20 weight percent of the cover material, a high acid ethylene/methacrylic acid copolymer with partial neutralization of the acid groups with sodium ions in an amount of 20 to 30 weight percent of the cover, a high acid ethylene/methacrylic acid copolymer with partial neutralization of the acid groups with zinc ions in an amount of 30 to 50 weight percent of the cover, an ethylene/methacrylic acid copolymer with partial neutralization of the acid groups with sodium ions in an amount of 5 to 15 weight percent of the cover, the cover having a thickness ranging from 0.038 inch to 0.045 inch, the cover material having a Shore D hardness ranging from 50 to 58;
   wherein the golf ball has a diameter of at least 1.68 inches, a mass of at least 45 grams, a coefficient of restitution of at least 0.780, and a PGA compression ranging from 35 to 50.

2. The two-piece golf ball according to claim 1 wherein the core has a diameter of 1.59 inches.

3. The two piece golf ball according to claim 1 wherein the cover material has a Shore D hardness of 56.

4. A two-piece golf ball comprising:
   a solid core comprising a single neodymium-catalyzed polybutadiene, zinc diacrylate ranging from 10 to 20 weight percent of the core, zinc oxide ranging from 10 to 17 weight percent of the core, zinc stearate in an amount of 3 to 8 weight percent of the core and zinc pentachlorothiophenol in an amount of 0.25 to 1.0 weight percent of the core, wherein the core has a mass ranging from 38 grams to 42 grams, a diameter ranging from 1.575 inch to 1.62 inch, and a PGA compression ranging from 20 to 30;
   a cover disposed on the core, the cover composed of a material comprising a very-low modulus ethylene/methacrylic acid copolymer with partial neutralization of the acid groups with sodium ions in an amount of 5 to 20 weight percent of the cover material, a high acid ethylene/methacrylic acid copolymer with partial neutralization of the acid groups with sodium ions in an amount of 20 to 30 weight percent of the cover, a high acid ethylene/methacrylic acid copolymer with partial neutralization of the acid groups with zinc ions in an amount of 30 to 50 weight percent of the cover, an ethylene/methacrylic acid copolymer with partial neutralization of the acid groups with sodium ions in an amount of 5 to 15 weight percent of the cover, the cover having a thickness ranging from 0.038 inch to 0.045 inch, the cover material having a Shore D hardness ranging from 50 to 58;

wherein the golf ball has a diameter of at least 1.68 inches, a mass of at least 45 grams, a coefficient of restitution of at least 0.780, and a PGA compression ranging from 35 to 50.

5. A two-piece golf ball comprising:
a solid core having a mass ranging from 38 grams to 42 grams, a diameter ranging from 1.575 inch to 1.62 inch, and a PGA compression ranging from 20 to 30, the solid core comprising a single neodymium-catalyzed polybutadiene, zinc diacrylate ranging from 10 to 20 weight percent of the core, zinc oxide ranging from 10 to 17 weight percent of the core, zinc stearate in an amount of 3 to 8 weight percent of the core and zinc pentachlorothiophenol in an amount of 0.25 to 1.0 weight percent of the core;
a cover disposed on the core, the cover composed of a material comprising a very-low modulus ethylene/methacrylic acid copolymer with partial neutralization of the acid groups with sodium ions in an amount of 5 to 20 weight percent of the cover material, a high acid ethylene/methacrylic acid copolymer with partial neutralization of the acid groups with sodium ions in an amount of 20 to 30 weight percent of the cover, a high acid ethylene/methacrylic acid copolymer with partial neutralization of the acid groups with zinc ions in an amount of 30 to 50 weight percent of the cover, an ethylene/methacrylic acid copolymer with partial neutralization of the acid groups with sodium ions in an amount of 5 to 15 weight percent of the cover the cover having a thickness ranging from 0.035 inch to 0.050 inch, the cover material having a Shore D hardness ranging from 50 to 58;
wherein the golf ball has a diameter of at least 1.68 inches, a mass of at least 45 grams, a coefficient of restitution of at least 0.780, and a PGA compression ranging from 35 to 50.

6. A two-piece golf ball comprising:
a solid core having a mass ranging from 38 grams to 42 grams and a PGA compression ranging from 20 to 30, the solid core comprising a single neodymium-catalyzed polybutadiene, zinc diacrylate ranging from 10 to 20 weight percent of the core, zinc oxide ranging from 10 to 17 weight percent of the core, zinc stearate in an amount of 3 to 8 weight percent of the core and zinc pentachlorothiophenol in an amount of 0.25 to 1.0 weight percent of the core;
a cover disposed on the core, the cover composed of a material comprising a very-low modulus ethylene/methacrylic acid copolymer with partial neutralization of the acid groups with sodium ions in an amount of 5 to 20 weight percent of the cover material, a high acid ethylene/methacrylic acid copolymer with partial neutralization of the acid groups with sodium ions in an amount of 20 to 30 weight percent of the cover, a high acid ethylene/methacrylic copolymer with partial neutralization of the acid groups with zinc ions in an amount of 30 to 50 weight percent of the cover, an ethylene/methacrylic acid copolymer with partial neutralization of the acid groups with sodium ions in an amount of 5 to 15 weight percent of the cover the cover having a thickness ranging from 0.035 inch to 0.045 inch, the cover material having a Shore D hardness ranging from 50 to 58;
wherein the golf ball has a diameter of at least 1.68 inches, a mass of at least 45 grams, a coefficient of restitution of at least 0.790, and a PGA compression ranging from 35 to 50.

\* \* \* \* \*